(12) United States Patent
Kao et al.

(10) Patent No.: US 10,760,369 B2
(45) Date of Patent: Sep. 1, 2020

(54) VARIABLE RADIUS BACKUP RING FOR A DOWNHOLE SYSTEM

(71) Applicants: Conrad Kao, Spring, TX (US); Eugene Stolboushkin, Houston, TX (US)

(72) Inventors: Conrad Kao, Spring, TX (US); Eugene Stolboushkin, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 150 days.

(21) Appl. No.: 15/622,310

(22) Filed: Jun. 14, 2017

(65) Prior Publication Data
US 2018/0363406 A1 Dec. 20, 2018

(51) Int. Cl.
*E21B 33/12* (2006.01)
*E21B 33/128* (2006.01)
*B33Y 80/00* (2015.01)

(52) U.S. Cl.
CPC .......... *E21B 33/1208* (2013.01); *B33Y 80/00* (2014.12); *E21B 33/128* (2013.01)

(58) Field of Classification Search
CPC .. E21B 33/1208; E21B 33/1212; E21B 33/12; E21B 33/134
See application file for complete search history.

(56) References Cited

U.S. PATENT DOCUMENTS

| 49,599 | A | 8/1865 | Sicouret |
| 1,301,285 | A | 4/1919 | Leonard |
| 2,136,597 | A | 11/1938 | Spang |
| 2,165,687 | A | 7/1939 | Thaheld |
| 2,196,668 | A | 4/1940 | Ragan |
| 2,430,623 | A | 11/1947 | Taylor, Jr. et al. |
| 3,358,766 | A * | 12/1967 | Current ............... E21B 33/1216 166/134 |
| 3,960,311 | A * | 6/1976 | Griffiths ............. B23K 37/0531 228/49.3 |
| 4,403,660 | A | 9/1983 | Coone |
| 4,665,978 | A | 5/1987 | Luke |
| 4,953,452 | A | 9/1990 | Tarlow |
| 7,178,602 | B2 * | 2/2007 | Hiorth ................. E21B 33/1216 166/118 |
| 7,422,071 | B2 | 9/2008 | Wilkie et al. |
| 7,921,921 | B2 | 4/2011 | Bishop et al. |
| 8,037,942 | B2 | 10/2011 | Vinson et al. |
| 8,191,625 | B2 | 6/2012 | Porter et al. |
| 8,479,809 | B2 | 7/2013 | Farquhar |

(Continued)

FOREIGN PATENT DOCUMENTS

| GB | 2435486 A | 7/2006 |
| WO | 2009074785 A2 | 6/2009 |
| WO | 2013173159 A1 | 11/2013 |

*Primary Examiner* — Robert E Fuller
*Assistant Examiner* — Theodore N Yao
(74) *Attorney, Agent, or Firm* — Cantor Colburn LLP

(57) ABSTRACT

A downhole system includes a packer assembly including a backup ring. The backup ring includes a plurality of nested leaves nested sequentially in a circumferential direction with adjacent circumferentially positioned leaves to collectively form a substantially circular shape. Each leaf includes a receiving section and an insertion section, the receiving section receiving an insertion section of an adjacent leaf. Upon radial expansion of the backup ring, the plurality of nested leaves fan out in the circumferential direction.

17 Claims, 8 Drawing Sheets

(56) References Cited

U.S. PATENT DOCUMENTS

| | | | |
|---|---|---|---|
| 9,133,681 B2* | 9/2015 | Smith | E21B 33/1216 |
| 9,506,322 B2* | 11/2016 | Prosser | E21B 34/14 |
| 9,670,747 B2 | 6/2017 | Ruffo | |
| 2002/0043368 A1* | 4/2002 | Bell | E21B 33/1216 |
| | | | 166/118 |
| 2004/0069502 A1 | 4/2004 | Luke | |
| 2009/0255690 A1 | 10/2009 | Conner et al. | |
| 2010/0186970 A1* | 7/2010 | Burnett | E21B 33/1216 |
| | | | 166/387 |
| 2013/0213672 A1 | 8/2013 | Nutley et al. | |
| 2015/0176361 A1* | 6/2015 | Prosser | E21B 34/14 |
| | | | 166/192 |
| 2016/0160602 A1 | 6/2016 | Ruffo | |

* cited by examiner

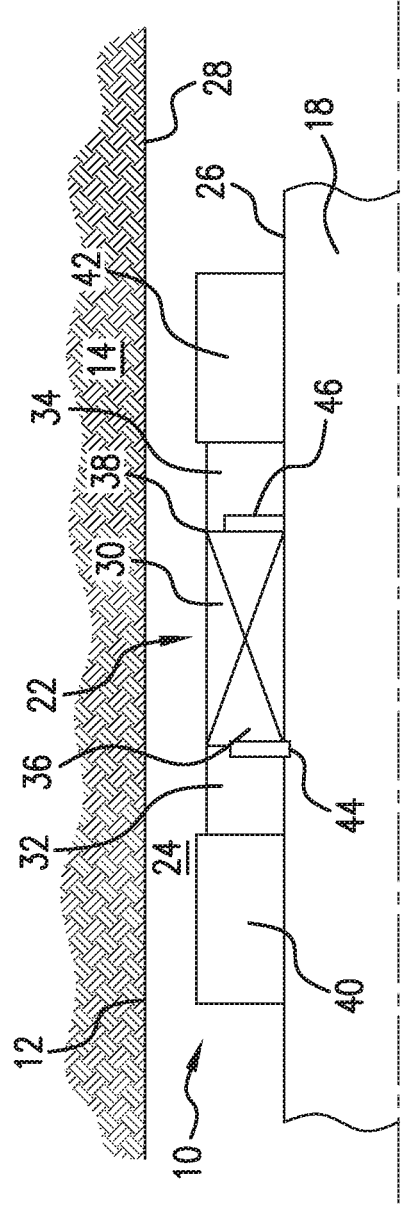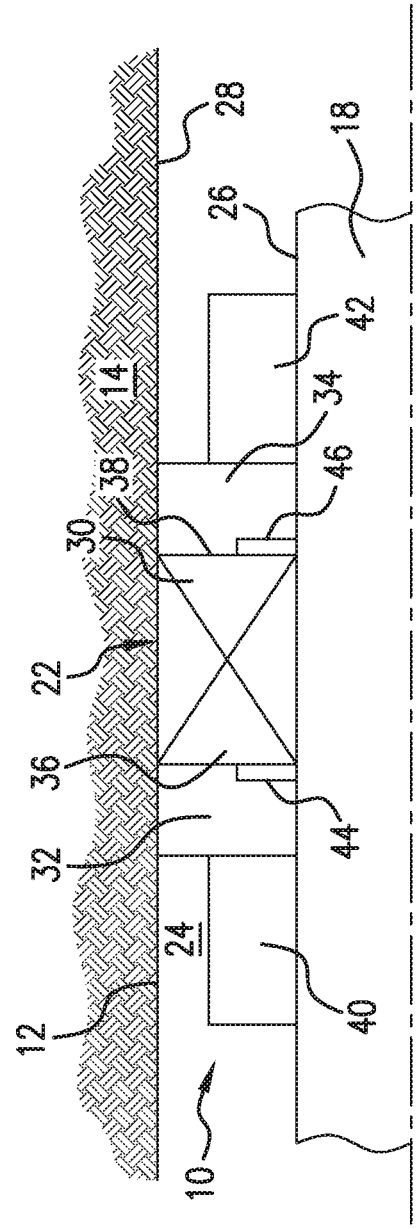

VARIABLE RADIUS BACKUP RING FOR A DOWNHOLE SYSTEM

BACKGROUND

In the drilling and completion industry, the formation of boreholes for the purpose of production or injection of fluid is common. The boreholes are used for exploration or extraction of natural resources such as hydrocarbons, oil, gas, water, and alternatively for $CO_2$ sequestration.

Packer systems are used to isolate zones within the borehole and create a seal between adjacent zones. High expansion functionality is desirable both for open hole and cased hole environments. Packer systems include a mandrel with a packing element disposed thereon. A support is disposed at each end of the packing element to facilitate elastic expansion of the packing element radially away from the mandrel when an axial load is placed on the packing element. In situations where there is a high differential pressure across the seal, extrusion of the seal becomes a concern. One or more backup rings are thus typically further disposed at each end of the packing element in an effort to limit any extrusion gaps to increase the pressure rating of the packer system. Although packer systems can sometimes still be functional with a small extrusion gap, a size of such an extrusion gap may affect the final performance ratings of the packer assembly.

The art would be receptive to improvements in downhole systems including expandable backup rings and methods.

SUMMARY

A downhole system includes a packer assembly including a backup ring. The backup ring includes a plurality of nested leaves nested sequentially in a circumferential direction with adjacent circumferentially positioned leaves to collectively form a substantially circular shape. Each leaf includes a receiving section and an insertion section, the receiving section receiving an insertion section of an adjacent leaf. Upon radial expansion of the backup ring, the plurality of nested leaves fan out in the circumferential direction.

A method of assembling a packer assembly for a downhole system includes forming first and second backup rings, each of the first and second backup rings including a plurality of nested leaves nested in a circumferential direction with adjacent circumferentially positioned leaves to collectively form a circular shape, each leaf amongst the plurality of nested leaves including a receiving section and an insertion section, the receiving section receiving an insertion section of an adjacent leaf; arranging a radially expandable packing element on a mandrel; and, arranging the first and second backup rings on the mandrel, with the packing element disposed between the first and second backup rings.

BRIEF DESCRIPTION OF THE DRAWINGS

The following descriptions should not be considered limiting in any way. With reference to the accompanying drawings, like elements are numbered alike:

FIG. 11 depicts a schematic view of the downhole system in a run-in condition; and FIG. 12 depicts a schematic view of the downhole system in a set condition.

DETAILED DESCRIPTION

A detailed description of one or more embodiments of the disclosed apparatus and method are presented herein by way of exemplification and not limitation with reference to the Figures.

Figure 1:
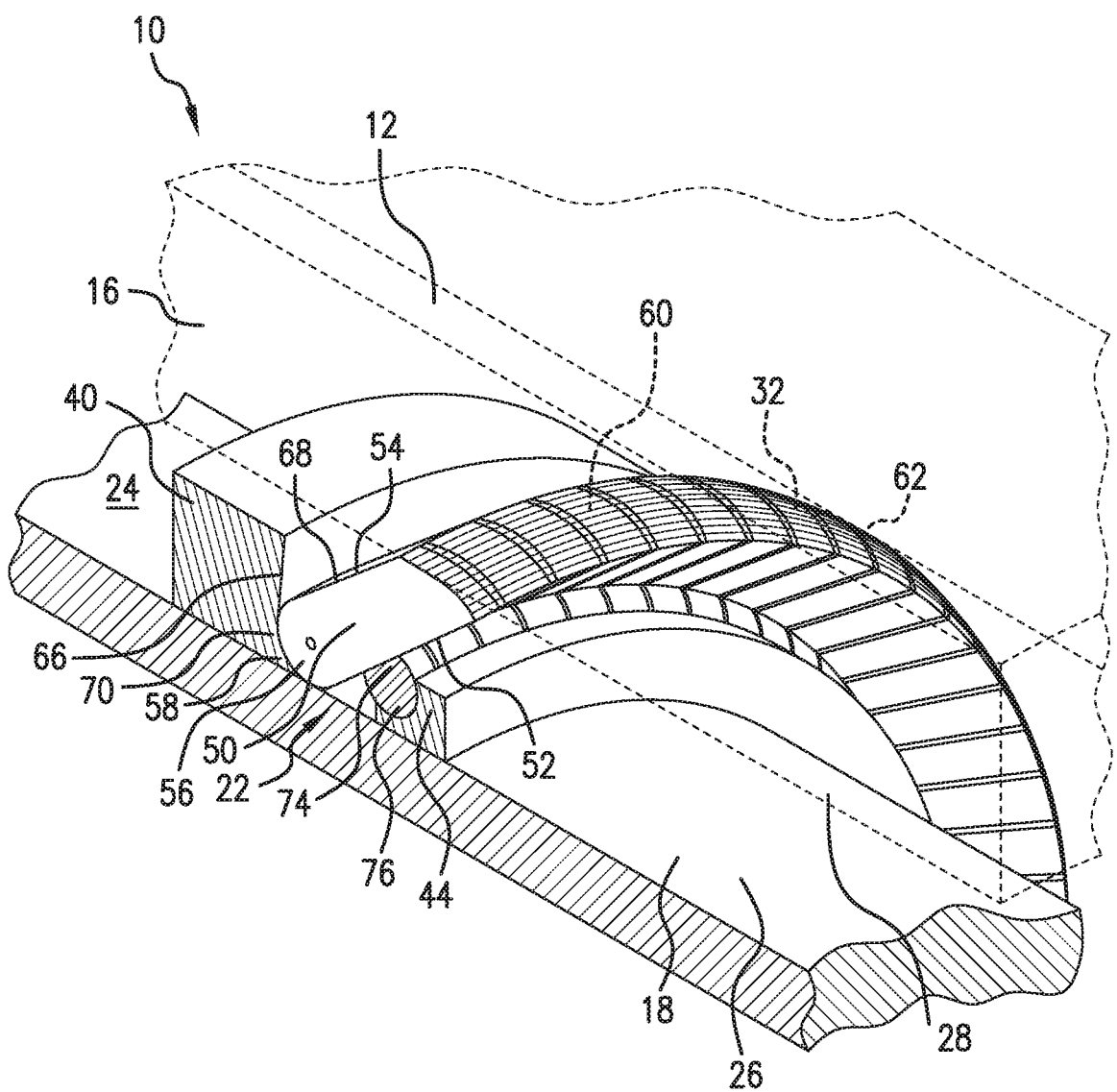
FIG. 1 depicts a schematic and partial perspective view of an embodiment of a downhole system including a portion of an embodiment of a packer assembly.
Figure 2:
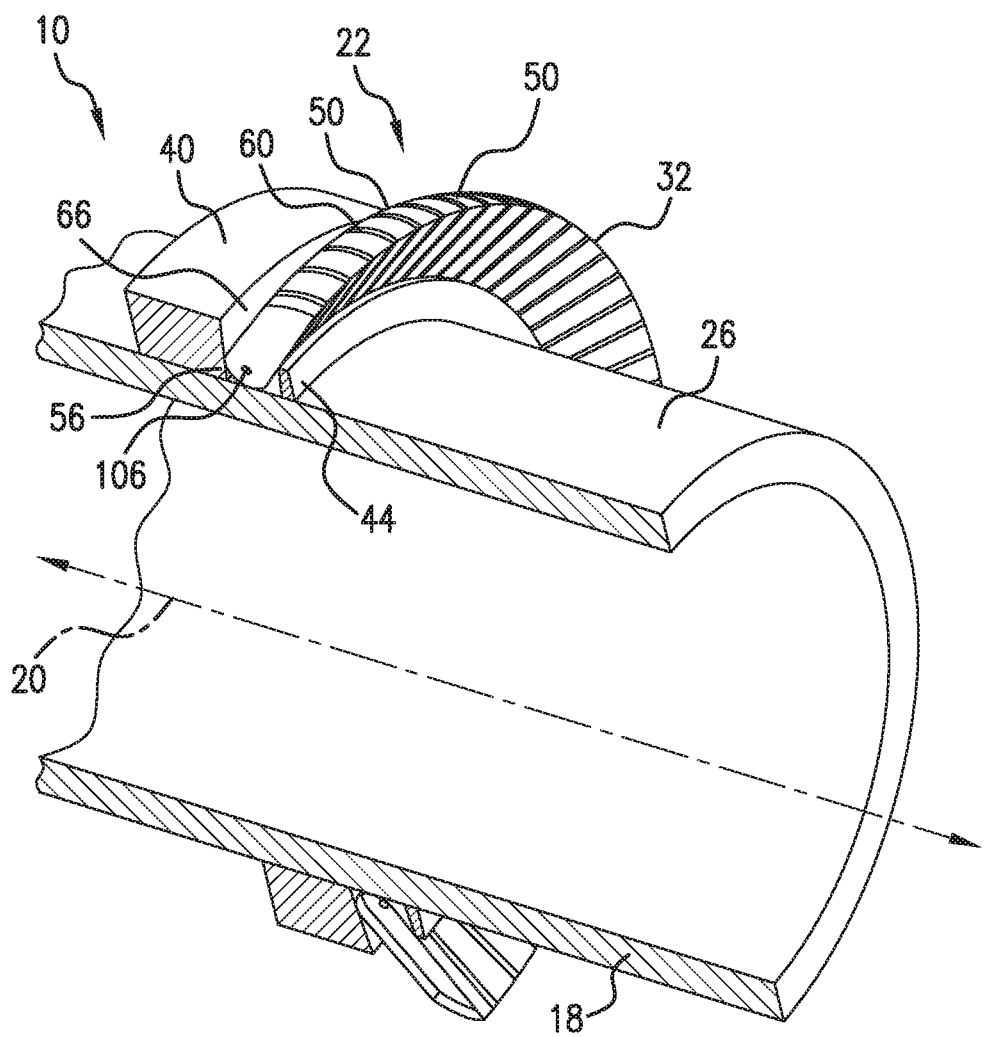
FIG. 2 depicts a schematic and partial perspective view of the packer assembly.

Referring to FIG. 1, a downhole system 10 is employed within an outer tubular 12 extending through a formation 14 (FIGS. 11 and 12) from a surface location. The outer tubular 12 may be just a borehole extending through the formation, or the borehole may be lined with casing 16. The downhole system 10 includes an inner mandrel 18 having a longitudinal axis 20 (FIG. 2). The inner mandrel 18 supports packer assembly 22 within the annulus 24 between an exterior surface 26 of the inner mandrel 18 and an interior surface 28 of the outer tubular 12.

With additional reference to FIGS. 11-12, the packer assembly 22 includes a packing element 30 and first and second backup rings 32, 34. The packing element 30 includes an elastomeric material, such as, but not limited to rubber, or other radially expandable material that can form a seal between the inner mandrel 18 and the outer tubular 12. The first backup ring 32 is positioned at a first longitudinal end 36 of the packing element 30 and the second backup ring 34 is positioned at a second longitudinal end 38 of the packing element 30. The packing element 30 and the first and second backup rings 32, 34 are movable between a run-in condition (collapsed and non-expanded state) having a first outer radius and a first width within the annulus 24, where the packing element 30 and the first and second backup rings 32, 34 are spaced from the interior surface 28 of the tubular 12, and a set condition (expanded state) having a second outer radius and a second width within the annulus 24, where the second outer radius and the second width are greater than the first outer radius and the second width. Also, when set, the second width fills the annulus 24 such that the packing element 30 and backup rings 32, 34 contact the interior surface 28 of the outer tubular 12 in the set condition. In one embodiment, the packer assembly 22 further includes first and second support members 40, 42 and first and second guide rings 44, 46. The first backup ring 32 is disposed between the first guide ring 44 and the first support member 40, and the second backup ring 34 is disposed between the second guide ring 46 and the second support member 42. Depending on the intended operation in which the packer assembly 22 is utilized, and on the mechanical interconnections to transition the packing element 30 and the backup rings 32, 34 between the run-in condition and the set condition, the features of the packer assembly 22 may be rearranged, such as, but not limited to, positioning one or both of the support members 40, 42 between the packing element 30 and the backup rings 32, 34, with one or both of the guide rings 44, 46 on the other side of the backup rings 32, 34. Further, while the backup rings 32, 34 may be arranged in opposite directions such that they open in a direction away from the packing element 30, in alternate embodiments one or both of the backup rings 32, 34 may be arranged such that they open in a direction towards the packing element 30. For convenience, only the first backup ring 32, first support member 40, and first guide ring 44 will be described in detail, but it should be understood that the second backup ring 34, second support member 42, and second guide ring 46 may include the same or substantially the same features.

As shown in FIGS. 1 and 2, the backup ring 32 include a plurality of leaves 50 that provide the backup ring 32 with high expansion capabilities while accommodating a large range of differently sized outer tubulars 12. Further, the leaves 50 at least substantially limit, and can even eliminate, any extrusion gaps that may be created between the leaves 50 of the backup ring 32 during its expansion from run-in condition to set condition. The plurality of leaves 50 nest within one another in a circumferential direction (around the circumference of the mandrel 18) and fan out during radial expansion, as will be further described. While the backup ring 32 and all of its leaves 50 share the same longitudinal location along mandrel 18, each leaf 50 has a width that spans a segment of the substantially circular shape of the backup ring 32 that is offset from all the other leaves 50 in the backup ring 32. While the segment occupied by a full width of one leaf 50 is partially overlapped by a first leaf 50 in a first circumferential direction and partially overlapped by a second leaf 50 in a second circumferential direction due to the nested configuration of all the leaves 50, no full width of two leaves 50 in the backup ring 32 occupy a same exact segment of the circular shape of the backup ring 32.

Figure 3:
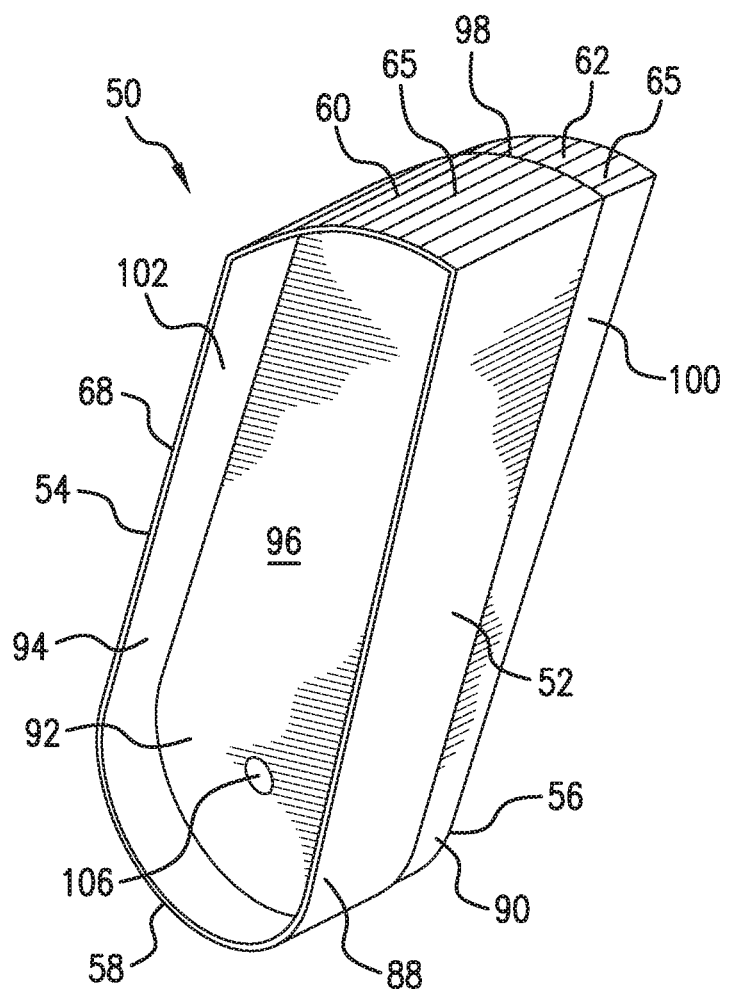
FIG. 3 depicts a perspective view of an embodiment of a leaf for an embodiment of a backup ring for the packer assembly of FIGS. 1 and 2.

One embodiment of a single leaf 50 is shown in FIG. 3. Each leaf 50 includes a first side 52, and a second side 54. A pivoting portion 56 of each leaf 50 extends between the first side 52 to the second side 54. The pivoting portion 56 is disposed at a radially interior portion 58 of the leaf 50, as well as the backup ring 32 (FIGS. 1 and 2). Each leaf 50 further includes a curved contacting portion 60 that will conform to the interior surface 28 of the outer tubular 12 depending on how much the leaves 50 have expanded to meet the interior surface 28 of the outer tubular 12. The contacting portion 60 is disposed at a radially exterior portion 62 of the leaf 50, as well as the backup ring 32 (FIGS. 1 and 2). The contacting portion 60 has a variable radius profile to make maximum contact with the outer tubular 12 at a wide range of inner diameters of the outer tubular 12. For example, the outer tubular 12 shown in FIG. 8 has a first inner diameter that is smaller than a second inner diameter of the outer tubular 12 shown in FIG. 9, yet the same backup ring 32 is employable and functional in both sizes of the outer tubular 12 because the profile of the contacting portion 60 will contact the interior surface 28 of the outer tubular 12 having a range of inner diameters. The larger the inner diameter of the outer tubular 12, see FIG. 9 for example, the closer the contacting location 64 (the location on the contacting portion 60 that makes contact with the outer tubular 12) will be to the first side 52 of the leaf 50. As demonstrated by FIG. 8, when the inner diameter of the outer tubular 12 is smaller, the contacting location 64 will be increasingly distanced from the first side 52, and closer to the second side 54. For outer tubulars 12 having inner diameters between that of the outer tubular 12 shown in FIG. 8 and that of the outer tubular 12 shown in FIG. 9, the contacting location 64 will be between the contacting location 64 shown in FIG. 8 and the contacting location 64 shown in FIG. 9. As one non-limiting example, the backup ring 32 may be used effectively in outer tubulars 12 having an inner diameter in the range of 8.5" to 9.875." However, it should be understood that the backup ring 32 can be sized to accommodate other ranges of inner diameters of outer tubulars 12.

Figure 8:
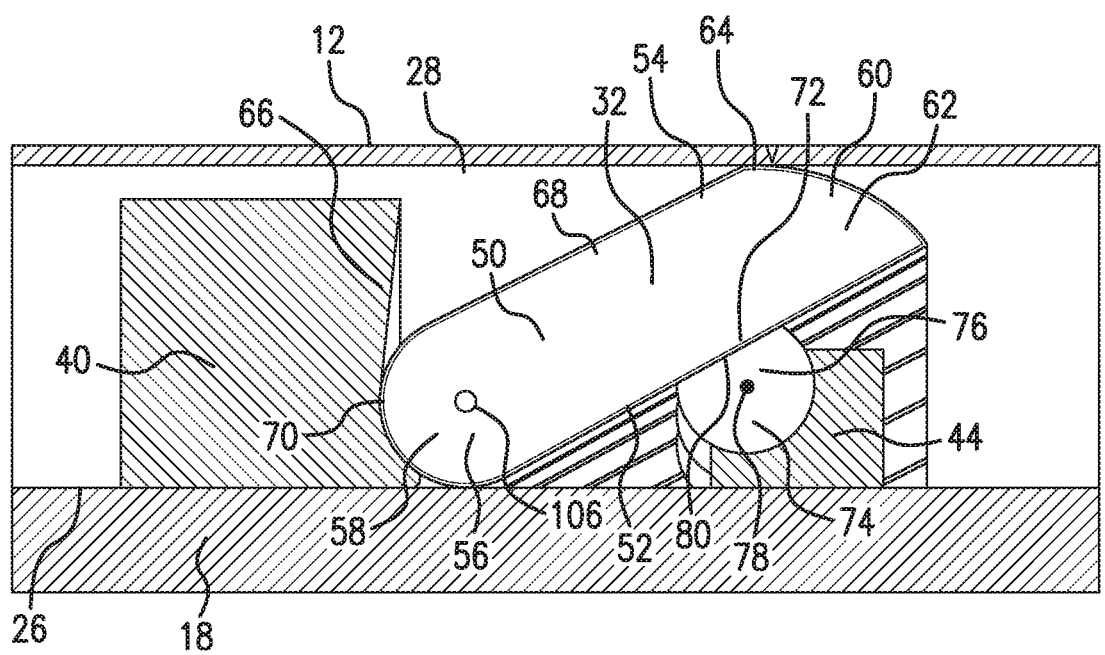
FIG. 8 depicts a schematic and partial perspective view of the packer assembly in a set condition within an outer tubular having a first inner diameter.

In one embodiment, the support member 40 is configured to be longitudinally stationary with respect to the mandrel 18. In such an embodiment, the support member 40 may be pinned, threaded, welded, integrally formed, or otherwise longitudinally fixed with respect to the mandrel 18. In alternate embodiments, the support member 40 may be movable with respect to the mandrel 18 while the guide ring 44 remains fixed with respect to the mandrel 18. The support member 40 is disposed circumferentially around the mandrel 18. The support member 40 includes a blocking surface 66 facing towards the backup ring 32. The second side 54 of each leaf 50 includes a stopping surface 68 (FIG. 3) disposed between the contacting portion 60 and the pivoting portion 56. The blocking surface 66 limits over travel of the backup ring 32 during expansion. In particular, the blocking surface 66 of the support member 40 can react against the stopping surface 68 of the backup ring 32 as the backup ring 32 is expanded. While the stopping surface 68 need not engage with the blocking surface 66 in all expansion stages of the backup ring 32 (for example, as shown in FIG. 8), the stopping surface 68 may abut against the blocking surface 66 and no further radial movement of the backup ring 32 may be permitted when the backup ring 32 is at maximum expansion (see FIG. 9). Maximum expansion of the backup ring 32 would be the point at which any further movement of the leaves 50 in either pivotal direction would result in the backup ring 32 having a smaller outer radius. In some embodiments, the blocking surface 66 may be angled with respect to the backup ring 32 to engage with the stopping surface 68 at a predetermined expansion of the backup ring 32. The support member 40 may further include a pivoting portion engagement surface 70 that engages with the pivoting portion 56 of the leaves 50 to assist in a smooth transition between the run-in condition to the set condition of the backup ring 32.

Figure 6:
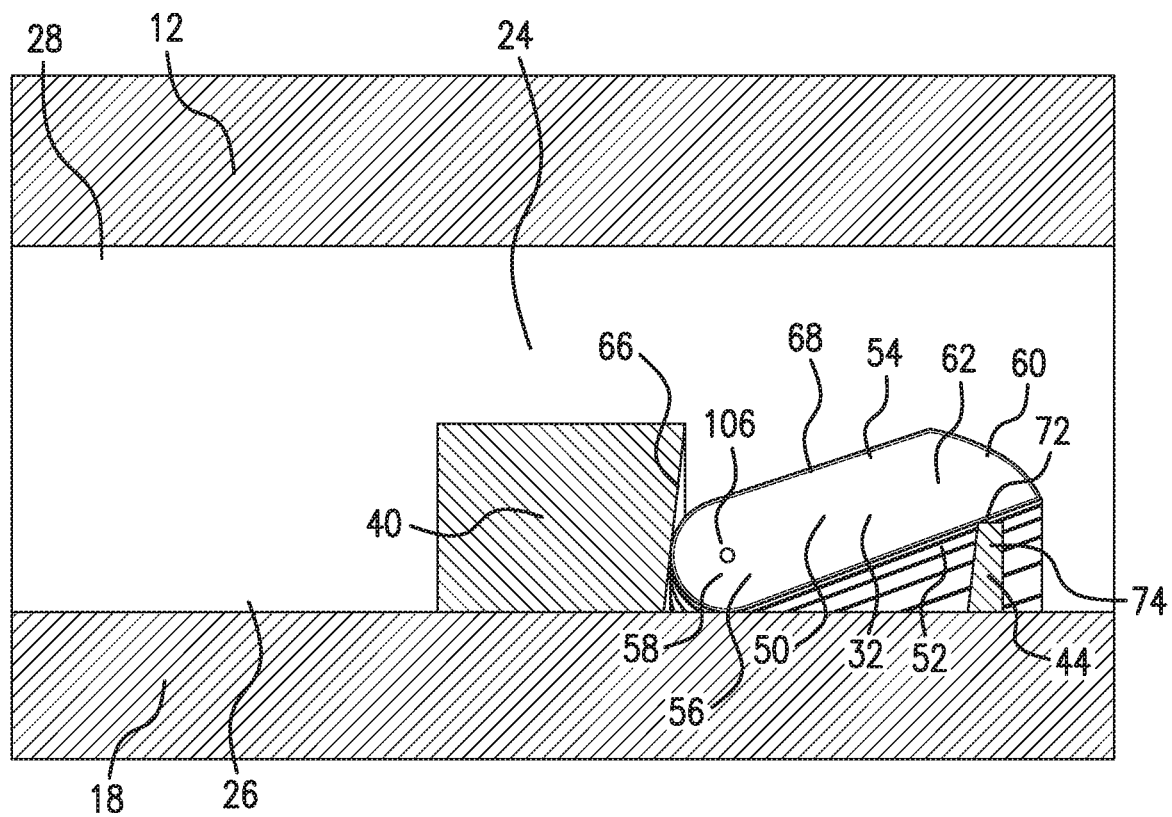
FIG. 6 depicts a schematic and partial perspective view of the packer assembly in a collapsed state for a run-in condition.

In one embodiment, expansion of the packing element 30 pushes against the first and second guide rings 44, 46 outwardly towards the first and second support members 40, 42, respectively. In such an embodiment, the first and second guide rings 44, 46 may be longitudinally movable with respect to the mandrel 18. In a run-in condition, as shown in FIG. 6, the guide ring 44 is in contact with the first side 52 of the leaves 50 at a location of the first side 52 which is closer to the radially exterior portion 62 than the radially interior portion 58. In one embodiment, the contact location 72 between the guide ring 44 and the backup ring 32 in the run-in condition is closer to the contacting portion 60 than the pivoting portion 56. As the guide ring 44 and the pivoting portion 56 of the leaves 50 are transitioned closer together, such as by the guide ring 44 moving longitudinally towards the support member 40, the contact location 72 will be located increasingly closer to the pivoting portion 56 of the leaves 50. Further, as the contact location 72 is located increasingly closer to the pivoting portion 56 of the leaves 50, the contact segment 74 of each guide ring 44 will slide along the first side 52 of the leaves 50 closer to the radially interior portion 58 of the backup ring 32 until either the stopping surface 68 of the leaves 50 engages with the blocking surface 66 of the support member 40, and/or when the contacting portion 60 is engaged with the interior surface 28 of the tubular 12.

Figure 5:
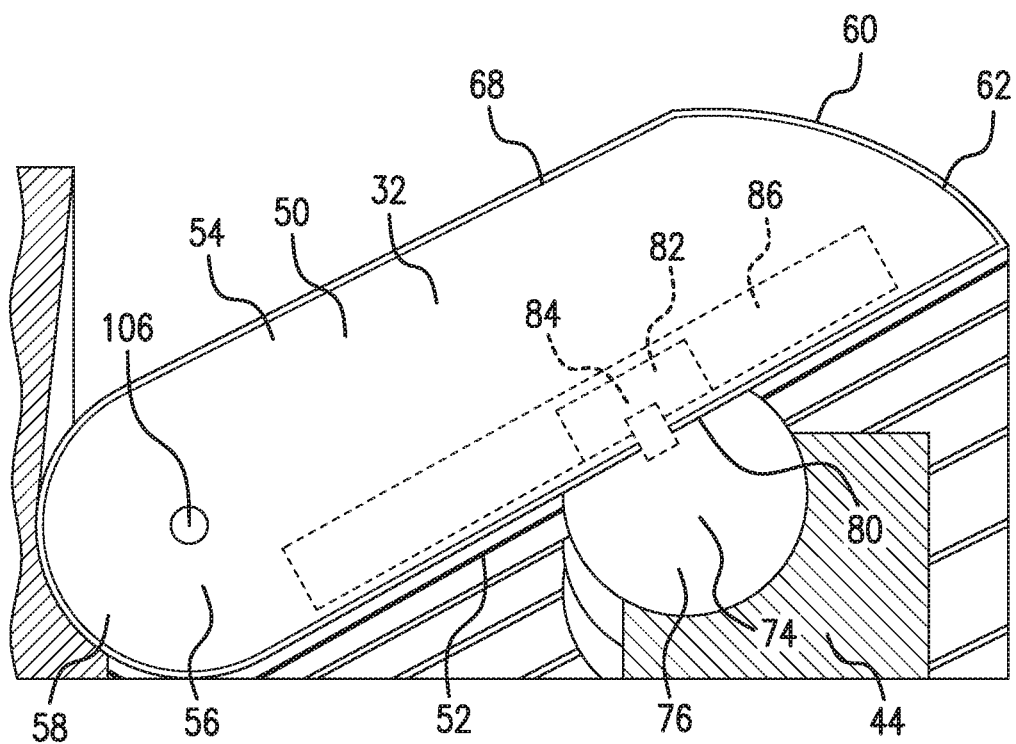
FIG. 5 depicts a schematic and partial perspective view of an embodiment of a slidable locking connection between the leaf and an embodiment of a guide ring.
Figure 9:
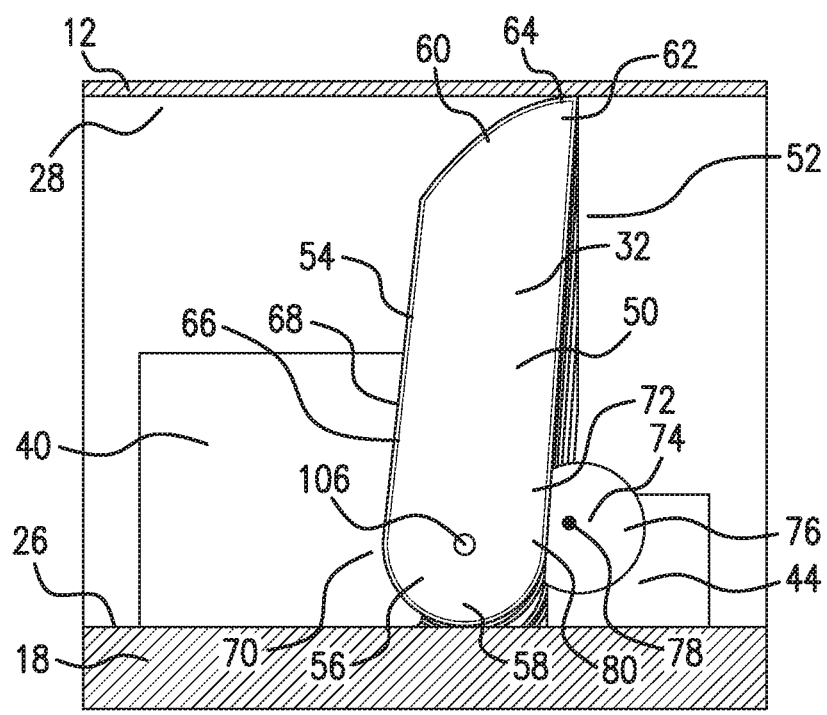
FIG. 9 depicts a schematic and partial perspective view of the packer assembly in a set condition within an outer tubular having a second inner diameter greater than the first inner diameter of FIG. 8.

With reference to FIGS. 8 and 9, in one embodiment, the contact segments 74 of the guide ring 44 include bearings 76, such as, but not limited to bearing rods that fit into the guide ring 44. The bearings 76 may rotate with respect to the guide ring 44 about a pivot axis 78, where the pivot axis 78 would be different for each bearing 76. The bearings 76 may include a bearing face 80 that stays in contact with the first side 52 of the leaves 50 while the leaves 50 are being pushed to pivot and extend radially outward. The face 80 prevents the guide rings 44 from point loading the leaves 50 as the bearings 76 spread out the loading (in contrast to a guide ring 44 not having bearings 76). In one embodiment, both the bearing face 80 and the first side 52 of the leaves 50 are substantially flat, although other corresponding shapes of the bearing face 80 and the first side 52 may be included for a reduced friction interface. The bearing face 80 and/or the first side 52 may further include friction-reducing material. In another embodiment, the guide ring 44 and the first side 52 may be slidably locked together using a slidable locking connection 82, such as shown in FIG. 5. The slidable locking connection 82 may, in one embodiment, include a tongue and groove interface where the tongue 84 is provided in one of the guide ring 44 and the first side 52, and the groove 86 is provided in the other of the guide ring 44 and the first side 52. During relative movement between the guide ring 44 and the leaves 50, the tongue 84 can slide within the groove 86, however the guide ring 44 cannot be separated from the leaves 50 due to the slidable locking connection 82. In the illustrated embodiment, the tongue 84 is an extension of the guide ring 44, and in particular an extension of the bearing 76, and the groove 86 is provided along the first side 52 of the leaf 50, with the tongue 84 slidably trapped within the groove 86. As previously described, the guide ring 44 engages with the backup ring 32 to expand the backup ring 32. Using the slidable locking connection 82, when the packing element 30 collapses, or when the packer assembly 22 is desired to be un-set or retrieved (transitions from radially expanded state to radially collapsed state), the guide ring 44 can pull the leaves 50 back radially inward because of the tongue and groove connection. Such a configuration would be useful in a retrievable and reusable packer assembly 22.

Figure 4:
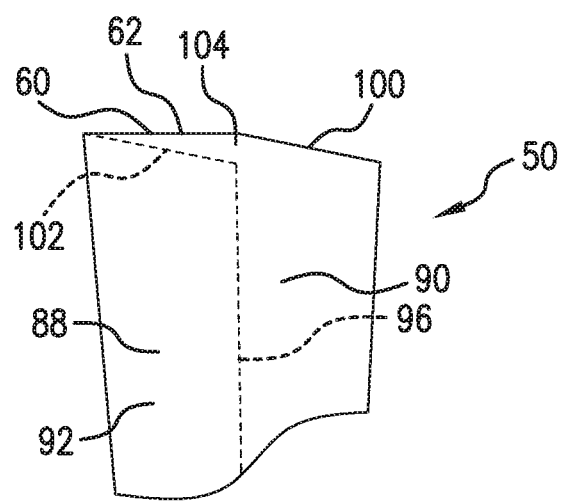
FIG. 4 depicts a schematic view of a portion of an alternate embodiment of the leaf for the backup ring of the packer assembly of FIGS. 1 and 2.
Figure 7:
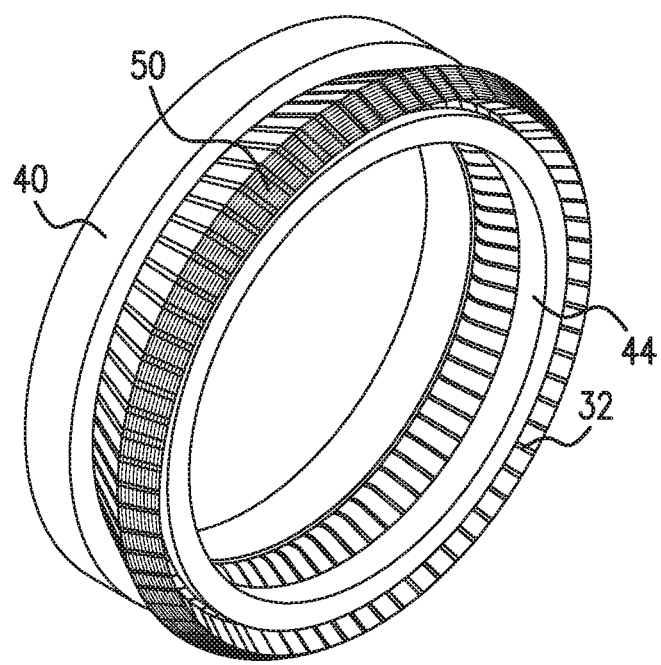
FIG. 7 depicts a perspective view of a portion of the packer assembly in the collapsed state.

With reference again to the leaf 50 shown in FIG. 3, the backup ring 32 may be formed by a plurality of such leaves 50 that may be identical, or substantially identical. In one embodiment, each leaf 50 includes a receiving section 88 and an insertion section 90, which together form a width of one leaf 50, where the width of the leaf 50 spans a segment of the circular shape of the backup ring 32, with the receiving section 88 and insertion section 90 circumferentially arranged with respect to each other. The receiving section 88 includes a pocket 92 having peripheral walls 94 and may further include pocket base 96. The pocket 92 faces in a circumferential direction, as opposed to a longitudinal direction or radial direction, for receiving the insertion section 90 of an adjacent circumferentially arranged leaf 50. The insertion section 90 is sized to be received in the pocket 92 of an adjacent leaf 50. For reducing the possibility of an extrusion gap, the inner surface 102 of the receiving section 88 (the inner surface 102 is that of the peripheral walls 94) contacts the outer surface 100 of the insertion section 90, and they substantially share a same peripheral shape. In one embodiment, a shoulder or step feature 98 is formed between the insertion section 90 and the receiving section 88, as shown in FIG. 3. However, as shown in FIG. 4, instead of a shoulder or step feature 96, the outer surface 100 of the leaf 50 along the insertion section 90 at the radially exterior portion 62 may include a gradual slope or curve extending from the receiving section 88, and the inner surface 102 of the receiving section 88 in the pocket 92 in an adjacent leaf 50 may include a corresponding gradual slope, thus forming a swept feature 104 instead of the step feature 98 (FIG. 3). In either embodiment, each leaf 50 includes the pocket 92 for receiving a portion of an adjacent leaf 50 so that the leaves 50 are nested within each other in a circumferential direction of the backup ring 32 around the mandrel 18. In the run-in condition, the insertion section 90 may be fully or substantially fully seated within the receiving section 88 of an adjacent leaf 50. One embodiment of a run-in condition (radially collapsed condition) is shown in FIGS. 6 and 7.

Figure 10:
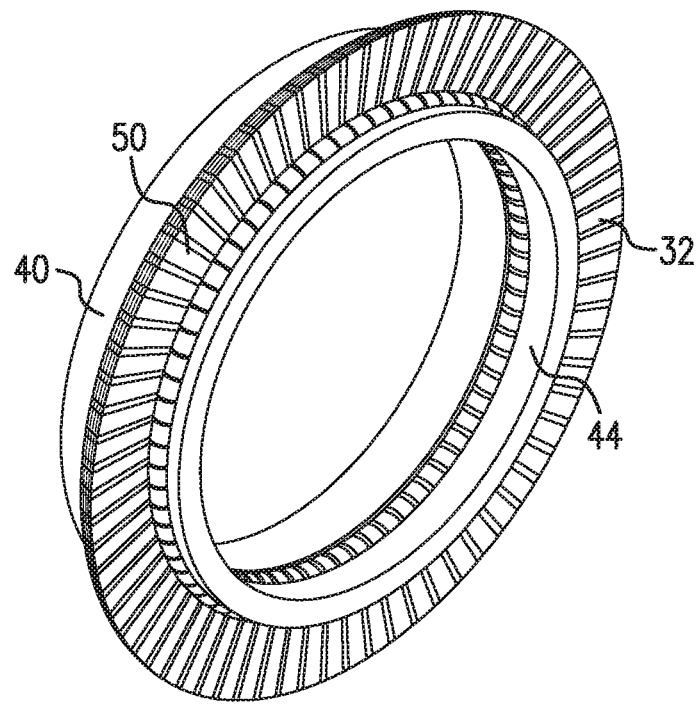
FIG. 10 depicts a perspective view of a portion of the packer assembly in the fully expanded state.

As relative longitudinal movement between the guide ring 44 and the backup ring 32 forces the radially exterior portion 62 radially outward, the inner diameter of the backup ring 32 remains constant while the leaves 50 pivot about pivot point 106 in the pivot portion 56 at the radially interior portion 58 of the leaves 50. Therefore, the radially interior portion 58 of the leaves 50 do not move circumferentially with respect to each other. However, the radially exterior portion 62 of the leaves 50 move circumferentially with respect to radially exterior portion 62 of adjacent leaves 50 in order to provide the larger outer diameter and larger outer circumference of the backup ring 32 in the radially expanded condition (for a set condition). That is, the radially exterior portion 62 of the leaves 50 fan out with respect to each other by the insertion sections 90 of the leaves 50 moving partially out of their respective receiving sections 88 of the adjacent leaves 50. The contacting portion 60 may include a plurality of lands 65 (FIG. 3) that span a width of each leaf 50 for increasing an area of contact between the leaves 50 and the interior surface 28 of the outer tubular 12. The amount of the insertion section 90 that ultimately remains seated in the receiving section 88 of an adjacent leaf 50 in a set condition of the packer assembly 22 depends on the inner diameter of the outer tubular 12. In one embodiment of the backup ring 32, an outer tubular 12 having a smaller inner diameter such as shown in FIG. 8 will seat more of the insertion section 90 of each leaf 50 into the receiving section 88 of the adjacent leaves 50 than in the outer tubular 12 having a larger inner diameter shown in FIG. 9. As shown by comparing FIGS. 7 and 10, the outer diameter of the backup ring 32 and the outer circumference of the backup ring 32 both increase as the backup ring 32 is radially expanded. Further, even in a fully expanded condition such as shown in FIG. 10, the backup ring 32 exhibits no to extremely limited extrusion gaps between leaves 50 because of the nested nature of the adjacent leaves 50. The elimination of extrusion gaps is enabled using a single backup ring 32 on each side of the packing element 30.

In one method of assembling the packer assembly 22 for the downhole system 10, additive manufacturing (3D printing) may be employed to make the interlocking leaves 50 of the expandable backup ring 32. The use of additive manufacturing enables the formation of specific geometry of the leaves 50, such as the contact profile of the contacting portion 50, which would be difficult to create using traditional methods. While additive manufacturing could be used to make a single leaf 50 at a time, which are then subsequently nested and arranged as a backup ring 32, additive manufacturing can be advantageously employed to make the entire backup ring 32 at once, thus saving a significant amount of assembly time. While additive manufacturing has been described, the leaves 50 may be separately formed using conventional methods, although the subsequent assembly time would be required.

Thus, a backup ring 32 (and 34) is disclosed that includes a plurality of leaves 50 nested together in the collapsed state for a run-in condition, that can expand to accommodate a larger inner diameter of an outer tubular 12, while the nested portions of the leaves 50 simultaneously expand in a circumferential direction to also accommodate the increased radial dimension. The backup ring 32 can be scaled to be applicable to a wide range of inner diameters of outer tubulars 12. Variable radius nested leaves 50 minimize deformation at the set condition, yet can still radially conform to a variety of inner diameters. The lack of deformation required for expansion provides strength to the backup ring 32, as well as the potential for reusability. Rather than relying on deformation of the material, the backup ring 32 depends on its geometry and interlinking components to expand to a wide range of diameters. Conventional packer backup rings are typically machined from a solid piece, and expansion from run-in state to final state is not as great a change as compared to the high expansion capability of the backup ring 32 with nested leaves 50. Further, the conventional packer backup rings that rely on deformation are not reusable because they are plastically yielded in the final state. While some packer assembly installations are permanent, in some operations removal may be desired and therefore reusability can be a desirable feature for some operations.

Set forth below are some embodiments of the foregoing disclosure:

Embodiment 1: A downhole system includes a packer assembly including a backup ring. The backup ring includes a plurality of nested leaves nested sequentially in a circumferential direction with adjacent circumferentially positioned leaves to collectively form a substantially circular shape. Each leaf includes a receiving section and an insertion section, the receiving section receiving an insertion section of an adjacent leaf. Upon radial expansion of the backup ring, the plurality of nested leaves fan out in the circumferential direction.

Embodiment 2: The downhole system as in any prior embodiment or combination of embodiments, wherein the receiving section of each leaf includes a pocket having a plurality of peripheral walls.

Embodiment 3: The downhole system as in any prior embodiment or combination of embodiments, wherein the pocket at a radially outward portion of the leaf has a greater depth than the pocket at a radially inward portion of the leaf.

Embodiment 4: The downhole system as in any prior embodiment or combination of embodiments, wherein the insertion section includes an outer periphery sized to nest within the plurality of peripheral walls of the pocket.

Embodiment 5: The downhole system as in any prior embodiment or combination of embodiments, further including a step feature between the insertion section and the receiving section.

Embodiment 6: The downhole system as in any prior embodiment or combination of embodiments, wherein the insertion section and receiving section have substantially matching outer and inner peripheries, respectively.

Embodiment 7: The downhole system as in any prior embodiment or combination of embodiments, wherein an inner periphery of the receiving section and an outer periphery of the insertion section include gradual sloping surfaces.

Embodiment 8: The downhole system as in any prior embodiment or combination of embodiments, wherein each leaf includes a first side and a second side, the first side configured to abut against a guide ring, and further including a curved contacting portion extending between the first side and the second side to accommodate various inner diameters of an outer tubular.

Embodiment 9: The downhole system as in any prior embodiment or combination of embodiments, wherein the guide ring includes a plurality of bearings in contact with the first side.

Embodiment 10: The downhole system as in any prior embodiment or combination of embodiments, wherein the first side is substantially flat and the bearings include a substantially flat bearing face in sliding contact with the first side.

Embodiment 11: The downhole system as in any prior embodiment or combination of embodiments, wherein the first side is slidably interlocked with a contact segment of the guide ring.

Embodiment 12: The downhole system as in any prior embodiment or combination of embodiments, wherein the first side includes one of a tongue and a groove, and the contact segment includes another of the tongue and the groove.

Embodiment 13: The downhole system as in any prior embodiment or combination of embodiments, wherein the backup ring is a first backup ring, and further comprising a second backup ring and a radially expandable packing element disposed between the first and second backup rings.

Embodiment 14: The downhole system as in any prior embodiment or combination of embodiments, further comprising first and second guide rings, wherein relative movement between the first and second backup rings and the first and second guide rings transitions the first and second backup rings between a collapsed condition and a radially expanded condition.

Embodiment 15: The downhole system as in any prior embodiment or combination of embodiments, further comprising first and second support members, the first backup ring disposed between the first support member and the first guide ring, and the second backup ring disposed between the second support member and the second guide ring, the first and second support members configured to support the first and second backup rings, respectively.

Embodiment 16: The downhole system as in any prior embodiment or combination of embodiments, wherein the backup ring is formed using additive manufacturing.

Embodiment 17: The downhole system as in any prior embodiment or combination of embodiments, wherein, during the radial expansion, a radially outward portion of the insertion section of each leaf moves circumferentially with respect to a radially outward portion of the receiving section in which the insertion section is nested.

Embodiment 18: A method of assembling a packer assembly for a downhole system includes forming first and second backup rings, each of the first and second backup rings including a plurality of nested leaves nested in a circumferential direction with adjacent circumferentially positioned leaves to collectively form a circular shape, each leaf amongst the plurality of nested leaves including a receiving section and an insertion section, the receiving section receiving an insertion section of an adjacent leaf; arranging a radially expandable packing element on a mandrel; and, arranging the first and second backup rings on the mandrel, with the packing element disposed between the first and second backup rings.

Embodiment 19: The method as in any prior embodiment or combination of embodiments, wherein forming the first and second backup rings includes using additive manufacturing to form the first and second backup rings.

Embodiment 20: The method as in any prior embodiment or combination of embodiments, further including disposing first and second guide rings on the mandrel such that relative longitudinal movement between the first and second backup rings and the first and second guide rings transitions the first and second backup rings between a collapsed condition and a radially expanded condition, wherein the first and second guide rings include a plurality of pivotal bearings configured to contact a face of at least some of the leaves of the first and second backup rings.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A downhole system including a mandrel comprising:
a packer assembly including a backup ring supported by the mandrel, the backup ring including a plurality of nested leaves nested sequentially within each other such that each of the plurality of nested leaves is surrounded by a peripheral wall of an adjacent one of the plurality of nested leaves in a circumferential direction to collectively form a circular shape, and each of the plurality of nested leaves including a first end, a second end, a receiving section extending between the first and second ends and an insertion section extending between the first and second ends, the receiving section receiving an insertion section of an adjacent leaf the first end of each of the plurality of nested leaves remaining a fixed distance from the mandrel during radial expansion of the backup ring,
wherein, upon the radial expansion of the backup ring, the plurality of nested leaves fan out in the circumferential direction.

2. The downhole system of claim 1, wherein the receiving section of each of the plurality of nested leaves includes a pocket defined by the peripheral wall.

3. The downhole system of claim 2, wherein the pocket at the second end of each of the plurality of nested leaves has a greater depth than the pocket at the first end of each of the plurality of nested leaves.

4. The downhole system of claim 2, wherein the insertion section includes an outer periphery sized to nest within the peripheral wall of the pocket.

5. The downhole system of claim 1, further comprising a step feature between the insertion section and the receiving section.

6. The downhole system of claim 1, wherein the insertion section and receiving section have matching outer and inner peripheries, respectively.

7. The downhole system of claim 1, wherein an inner periphery of the receiving section and an outer periphery of the insertion section include sloping surfaces.

8. The downhole system of claim 1, wherein each of the plurality of nested leaves includes a first side and a second side, the first side configured to abut against a guide ring, and further including a curved contacting portion extending between the first side and the second side to accommodate various inner diameters of an outer tubular.

9. The downhole system of claim 8, wherein the guide ring includes a plurality of bearings in contact with the first side.

10. The downhole system of claim 9, wherein the bearings include a bearing face that is in sliding contact with the first side of each of the plurality of nested leaves.

11. The downhole system of claim 8, wherein the first side is slidably interlocked with a contact segment of the guide ring.

12. The downhole system of claim 11, wherein the first side includes one of a tongue and a groove, and the contact segment includes another of the tongue and the groove.

13. The downhole system of claim 1, wherein the backup ring includes a first backup ring, a second backup ring, and a radially expandable packing element disposed between the first backup ring and the second backup ring.

14. The downhole system of claim 13, further comprising first and second guide rings, wherein relative movement between the first and second backup rings and the first and second guide rings transition the first and second backup rings between a collapsed condition and a radially expanded condition.

15. The downhole system of claim 14, further comprising first and second support members, the first backup ring disposed between the first support member and the first guide ring, and the second backup ring disposed between the second support member and the second guide ring, the first and second support members configured to support the first and second backup rings, respectively.

16. The downhole system of claim 1, wherein the backup ring is formed using additive manufacturing.

17. The downhole system of claim 1, wherein, during the radial expansion, a radially outward portion of the insertion section of each of the plurality of nested leaves moves circumferentially with respect to a radially outward portion of the receiving section in which the insertion section is nested.

\* \* \* \* \*